(12) United States Patent
Lantz

(10) Patent No.: US 6,378,793 B1
(45) Date of Patent: Apr. 30, 2002

(54) MULTI-PURPOSE SPREADER

(76) Inventor: Stephen G. Lantz, 305 Iona Rd., Lebanon, PA (US) 17242

( * ) Notice: Subject to any disclaimer, the term of this patent is extended or adjusted under 35 U.S.C. 154(b) by 0 days.

(21) Appl. No.: 09/675,795

(22) Filed: Sep. 29, 2000

(51) Int. Cl.[7] .................. A01C 19/00; A01C 17/00; G01C 19/20
(52) U.S. Cl. .................. 239/672; 239/680; 239/681; 239/676
(58) Field of Search .................. 239/661, 664, 239/667, 668, 669, 672, 676, 683, 675, 680, 657, 681, 671, 666; 198/778, 883

(56) References Cited

U.S. PATENT DOCUMENTS

| | | | | |
|---|---|---|---|---|
| 3,072,290 A | * | 1/1963 | De Biasi | 239/657 |
| 3,583,645 A | * | 6/1971 | Murray et al. | 239/657 |
| 3,705,482 A | * | 12/1972 | Purrer | 56/13.9 |
| 4,022,386 A | * | 5/1977 | Caye | 222/176 |
| 4,103,768 A | * | 8/1978 | Persson | 198/778 |
| 4,266,731 A | * | 5/1981 | Musso, Jr. | 239/676 |
| 4,450,953 A | * | 5/1984 | Le Cann et al. | 198/778 |
| 4,473,184 A | * | 9/1984 | Martin | 239/7 |
| 4,475,644 A | * | 10/1984 | Raippo | 198/407 |
| 4,709,861 A | * | 12/1987 | Henderson | 239/676 |
| 4,897,642 A | | 1/1990 | DiLullo et al. | |
| 5,025,253 A | | 6/1991 | DiLullo et al. | |
| 5,142,278 A | | 8/1992 | Moallemi et al. | |
| 5,386,943 A | * | 2/1995 | Peeters | 239/675 |
| 5,927,617 A | * | 7/1999 | Musso, Jr. et al. | 239/657 |
| 5,957,394 A | * | 9/1999 | Becker | 239/675 |

* cited by examiner

Primary Examiner—David A. Scherbel
Assistant Examiner—Davis Hwu

(57) ABSTRACT

A hollow, upright hopper to receive particulate material, means operable to discharge material outwardly from the hopper in one direction or in an opposite direction and control means to control the amount, the direction, and the velocity of the discharged material, so as to direct the material into a cattle feeding trough or to a cattle bedding area, for example.

6 Claims, 5 Drawing Sheets

MULTI-PURPOSE SPREADER

This disclosure relates to apparatus especially useful in the dairy business, and more specifically, apparatus useful for spreading animal feed such as silage along a trough, and for spreading bedding material in the stalls for the cows to rest on and for spreading other particulate material.

PRIOR ART AND OBJECTIVES

Dairy cows are typically fed from a long trough or other linear receptacle wherein the cows line up on one side of the trough and have access to the trough via a low retaining wall having partitions for spacing the feeding cows. The adjacent side of the trough is open so as to allow room for a vehicle to pass and unload feed into the trough along the trough length. Prior art spreaders do not provide the capability to discharge the desired quantity of feed while moving and confining the feed to the trough without wasting excessive feed by inadvertently overshooting or undershooting the trough and spreading the feed onto the ground. Thus, one objective of this instant disclosure is an apparatus which is mounted to a skid loader, having a hopper filled with silage or other animal feed, such that the feed may be discharged rapidly and accurately into the trough as the skid loader moves along the trough length.

Typically, the dairy cows sleep in stalls having a floor covered with a resilient bedding material such as sawdust or wood shavings or wood turnings. Normally, the bedding is removed and replaced daily, and it is therefore desirable that the task of uniformly spreading the bedding be accomplished rapidly. In the prior art it has been necessary to apply the bedding by driving a skid loader mounted hopper into each stall, spreading the bedding, backing out of the stall, turning the skid loader, entering the next stall, spreading the bedding, and repeating the process for each stall, in a spreading mode referred to as an intermittent spread.

Thus, another objective of this instant disclosure is spreading apparatus which discharges the bedding material from the side of the apparatus, so that the floor of the stalls may be covered with bedding as the skid loader passes along a path outside the stalls without having to enter the individual stalls.

Another objective is to provide apparatus which can be used to spread bedding material, then emptied and cleaned, and then be used for spreading animal feed into a trough or other feeding receptacle. The prior art spreaders do not provide the capability to use the same spreader for both moist animal feed such as corn silage and dry sawdust, owing primarily to the tendency for the moist silage to agglomerate or clump and fail to spread uniformly and reliably.

Yet another objective is to provide spreading apparatus useful for spreading other particulate material such as mulch or oil-absorbing material.

U.S. Pat. No. Des. 402,670, copy included herein, describes an ornamental design for a material spreader hopper.

BRIEF DESCRIPTION OF THE INVENTION

The disclosed apparatus provides the capability to spread a variety of particulate materials, both wet and dry, in several differing spreading modes. These spreading modes includes area coverage, such as blanketing the floor of cow stalls with bedding material; linear coverage, such as filling a long trough with animal feed; and forming piles or heaps of material such as animal feed placed in a pasture or feed lot.

A hopper for holding the spreadable material has a chain driven conveyor or belt conveyor located at the bottom of the hopper. The conveyor is driven by a hydraulic motor using pressurized fluid supplied by the prime mover such as a skid loader or tractor. The hopper interior has sloping surfaces to channel the material onto the conveyor. Moist or damp material such as silage tend to agglomerate or otherwise clump together and may resist falling onto the conveyor solely under the force of gravity.

This condition is prevented by a transversely mounted agitator shaft having a plurality of radial arms or beaters secured thereto. The beaters are immersed within the particulate material and the beaters are rotated around the agitator shaft so as to urge the material to move downward and onto the moving conveyor. The agitator shaft is also powered by a drive motor.

The direction of conveyor movement is controlled by the direction of the hydraulic fluid flow, and is thereby bidirectional so as to provide the capability to spread from either side of the apparatus. The quantity of material spread per minute is regulated by the opening in a manually controlled gate located at each end of the conveyor. The throw distance of the spread particulate material is controllable by the hydraulic fluid velocity, and the height of the hopper above the ground.

A removable deflector is provided for use when filling a trough with feed. The deflector plate intercepts the horizontal flow of discharged feed and deflects it downward, so as to minimize the feed spread outside the trough. The deflector is also useful in forming piles of spreadable material when desired, and for changing the direction of the discharged material.

The disclosed apparatus is useful for spreading particulate material such as animal feed along a trough, for example, and for spreading animal bedding by throwing the material for distances of the order of 20 feet so as to provide area coverage. The particulate material may be deposited in a heap when so desired. The term spreading is used in this disclosure to include linear spreading such as trough filling; area spreading such as bedding placement; and heap forming such as depositing feed in a pile.

In addition to its use for spreading animal feed and bedding materials, the disclosed apparatus is useful for spreading many other particulate materials, including mulch, oil-absorbers, and manure.

Following this brief description of the invention, a number of drawings, detailed descriptions and claims more fully define the invention.

DETAILED DESCRIPTION

Figure 1:
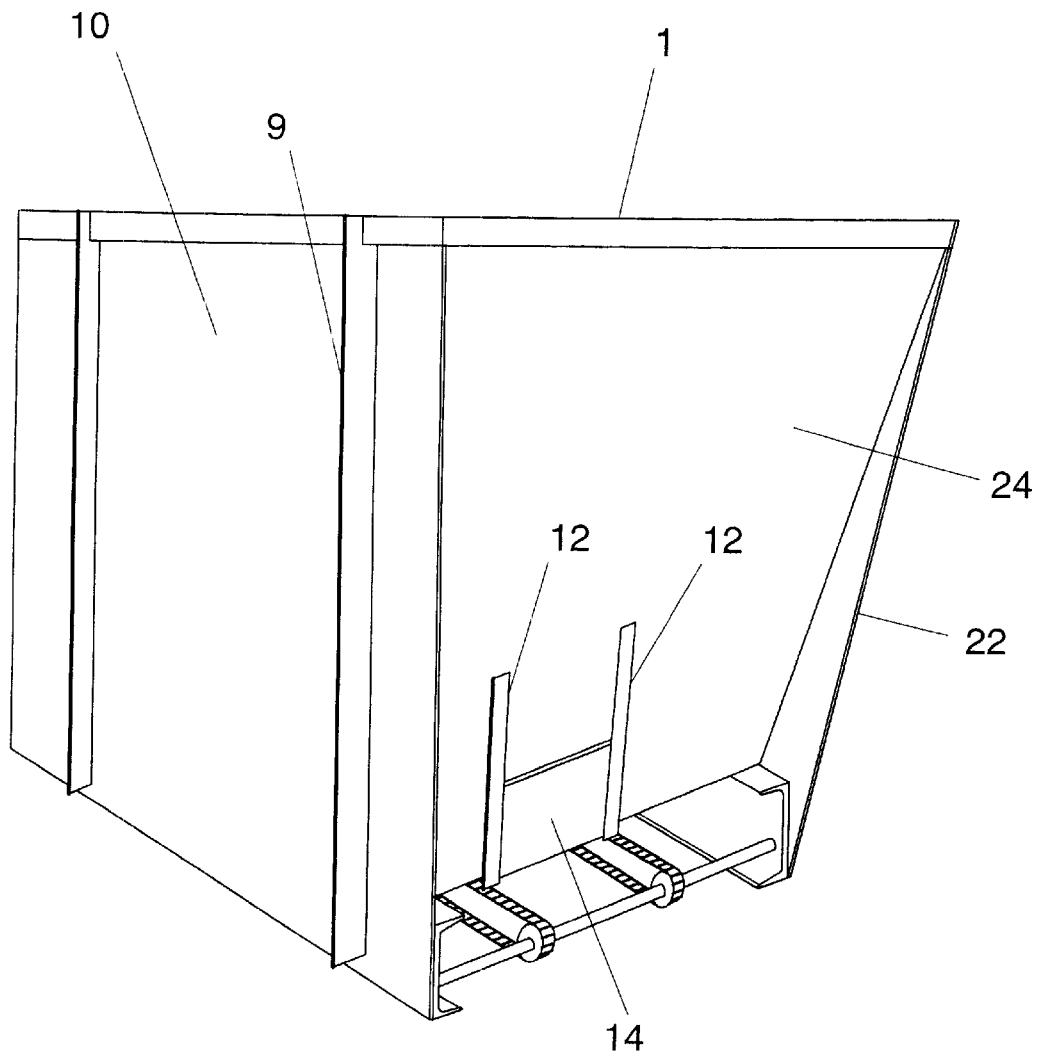
FIG. 1 is a perspective showing the spreader of this invention.

FIG. 1 shows a perspective view of the spreader as it rests on the ground. Forward wall 22, right sidewall 24 and rear wall 10 form three of the four walls comprising the hopper 1. Stiffener 9 provides added strength to rear wag 10 and is also used to form part of the skid-loader hitch, shown in FIG. 5. Spreadable material is ejected from hopper i via discharge opening 14, which is partially closed or covered by a gate, shown in FIG. 3. Gate retainers 12 provide support for gate 11.

Figure 2:
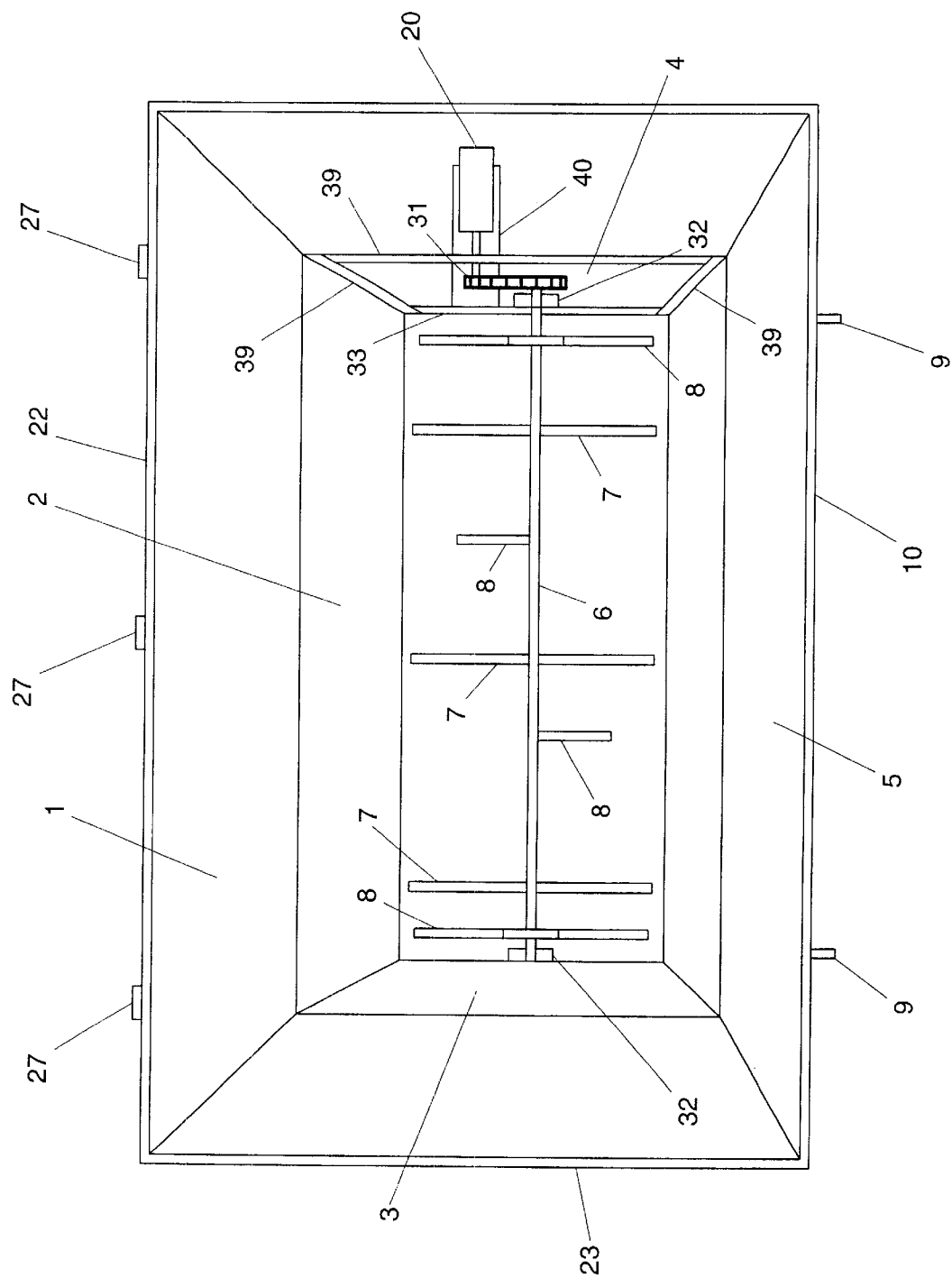
FIG. 2 is a plan view of the spreader showing the sloping baffles; the agitator shaft; and the beaters.

FIG. 2 shows the apparatus in plan view. Hopper 1 comprises a generally rectangular box-like structure having sloping baffles mounted within the hopper so as to facilitate the downward movement of the material being spread, and to prevent the material from forming pockets which could prevent the conveyor from receiving a constant supply of material. Agitator shaft 6 is driven by hydraulic motor 20. Shaft 6 mounts a plurality of beater arms 8 which rotate and assist in moving the spreadable material onto the conveyor floor 21. Conveyor slats 7 slides the material along the floor and discharges the material from the apparatus via discharge opening 14. Floor 21 is preferably covered with a polyethylene sheet so as to provide a long-wearing, smooth surface along which slats 7 slide.

Agitator shaft 6 is supported by bearings 32 and is powered by motor 20, which is mounted on bracket 40. The motor is connected to the agitator shaft 6 by chain 31. Thus, the apparatus can spread moist, damp materials like corn silage, and other clumping materials, and the apparatus can also spread dry materials such as sawdust.

Baffles 2 and 5 are transversely-mounted baffles which direct the material onto conveyor floor 21. Baffle 3 is a longitudinal baffle which directs the material onto conveyor floor 21. Frame 39 mounts a removable, sloping cover, which also directs the material onto conveyor 21. In use, the cover is secured to frame 39 to provide a sloping surface shown by lead line 4.

Hopper 1 comprises forward wall 22, rear wall 10, left side wall 23, and right side wall 24. Stiffeners 9 provides rigidity, and wear strips 27 are useful when the hopper is being filled by ramming the hopper into a pile of material.

Figure 3:
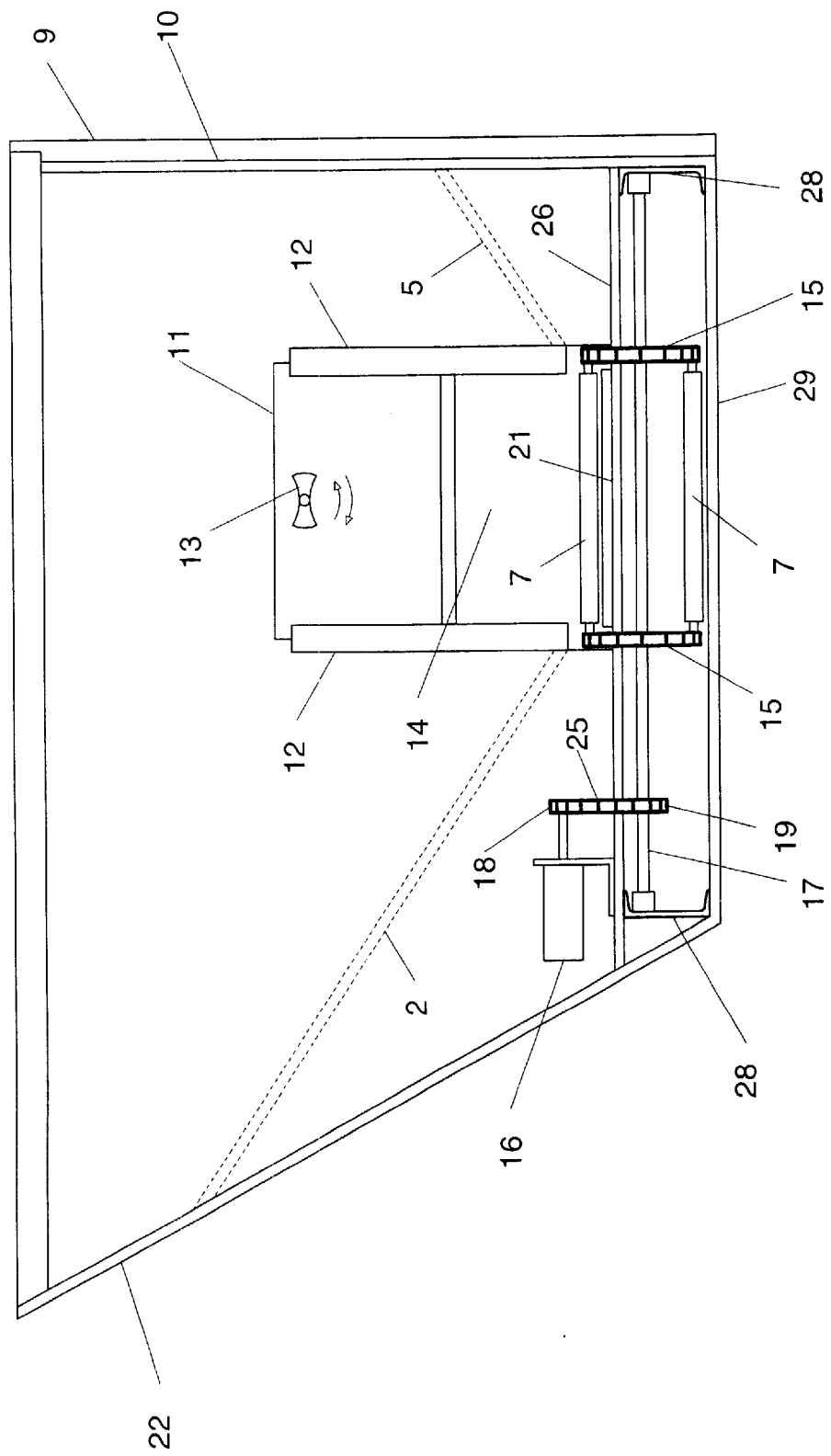
FIG. 3 is a side elevation showing the material discharge opening; the gate controlling the amount of material spread; and the chain conveyor.

FIG. 3 is a left side elevation of the spreader apparatus. Baffles 2 and 5 are shown with dashed lines. Spreadable material reaching the conveyor is propelled along the conveyor floor by slats 7 and discharged through opening 14. Gate 11 is adjustable vertically by sliding the gate 11 and locking in place by handle 13. Gate 11 is raised or lowered to change the rate of material discharged and the sideward distance to which the material is spread. Gate 11 slides between retainer plates 12. Floor plate 26 supports the conveyor surface 21 and forms the bottom of hopper 1.

Figure 6:
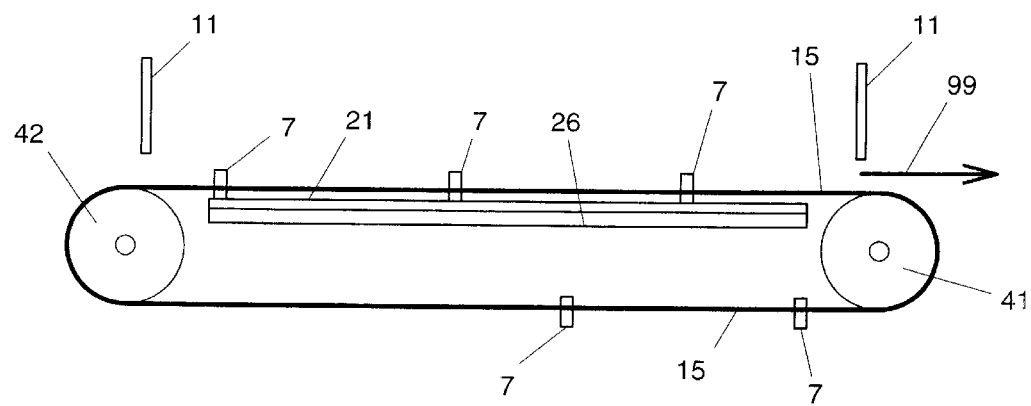
FIG. 6 depicts the conveyor arrangement in which slats move the material along a fixed surface.

The conveyor velocity is controlled by changing the hydraulic fluid pressure delivered by the vehicle to which the hopper is attached. Drive motor 16, preferably hydraulic, is coupled to conveyor drive shaft 17 via gears 18 and 19. These gears are coupled by chain 25. Conveyor chains 15 are coupled to drive shaft 17. Conveyor slats 7 are secured to chains 21 and slide along conveyor floor 21 as the chains move transversely. Sprocket 41 drives chain 1I. Idler sprocket 42 supports chain 15 at the opposite end. As shown in FIG. 6, the spreadable material is discharged in the direction of the arrow 99, in which gate 11 serves to control the rate f material discharged.

Figure 7:
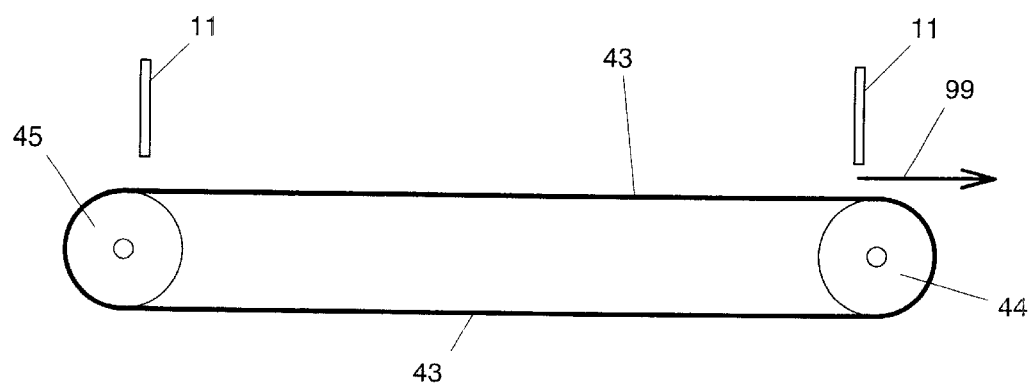
FIG. 7 depicts the conveyor arrangement in which a belt moves the particulate material.

It has been found to be advantageous to use a differing conveyor configuration to achieve better spreading with some types of particulate material such as mulch. In this conveyor embodiment, as shown in FIG. 7, a wide belt is used to support the weight of the material, move the material to the discharge opening 14, and to propel the material from the spreader. Conveyor belt 43 is supported and driven by rollers 44 and 45.

Figure 4:
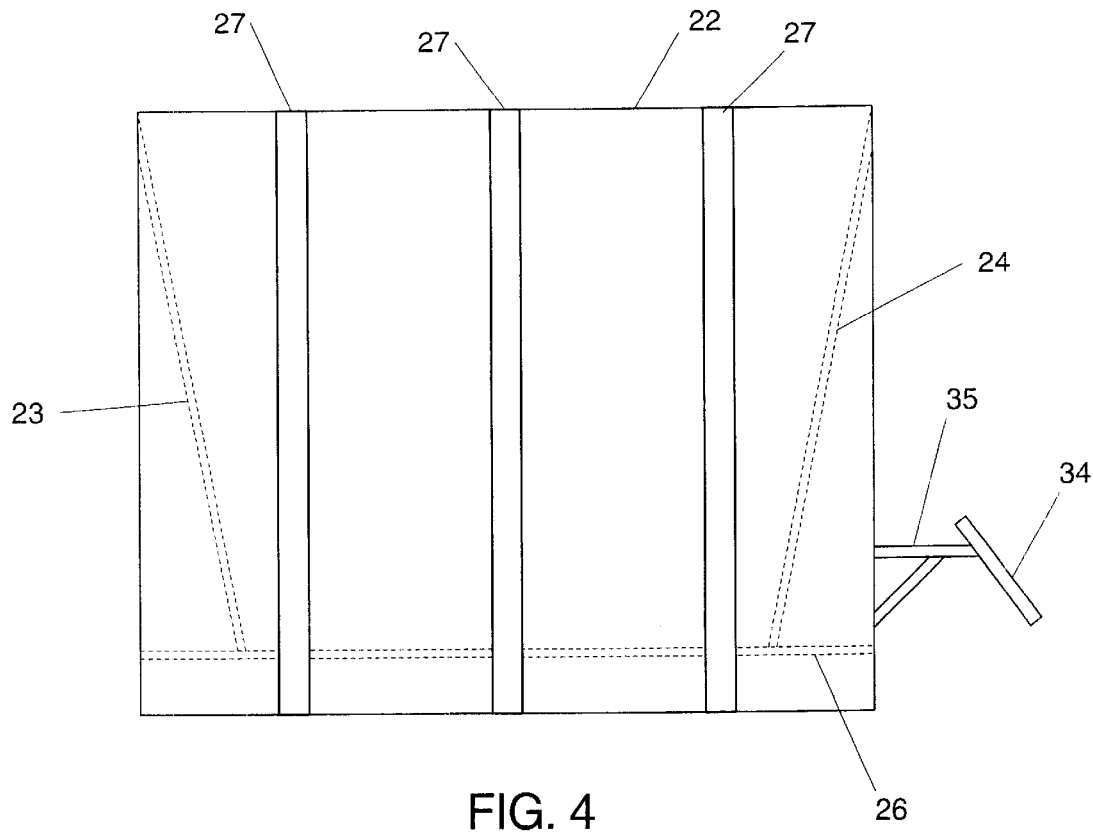
FIG. 4 is a front elevation showing the wear strips and deflector plate.

In FIG. 3 U-channels 28 provide structural rigidity for the apparatus. Longitudinal plates 29 supports the apparatus when resting on the ground, and prevent U-channels 28 from twisting under heavy load. Hopper sidewall plates 23 and 24 are sloped inward, as shown by the dashed lines in FIG. 4 to provide a shelf for mounting motor 16, wherein the motor and other vulnerable components are inset and protected by the forward and rear walls 22 and 10, respectively. The hopper forward wall 22 mounts wear strips 27, which are the primary contact surfaces when the hopper is scooping up a load of material to be spread. Deflector plate 34 provides the capability to spread the material along a trough without excess waste. The deflector plate 34 is supported by strut 35. The deflector assembly is removable from the apparatus, and it may be placed on either, side of the hopper. The deflector plate intercepts the stream of material discharged by the coneyor and forces the material into a downward direction.

Figure 5:
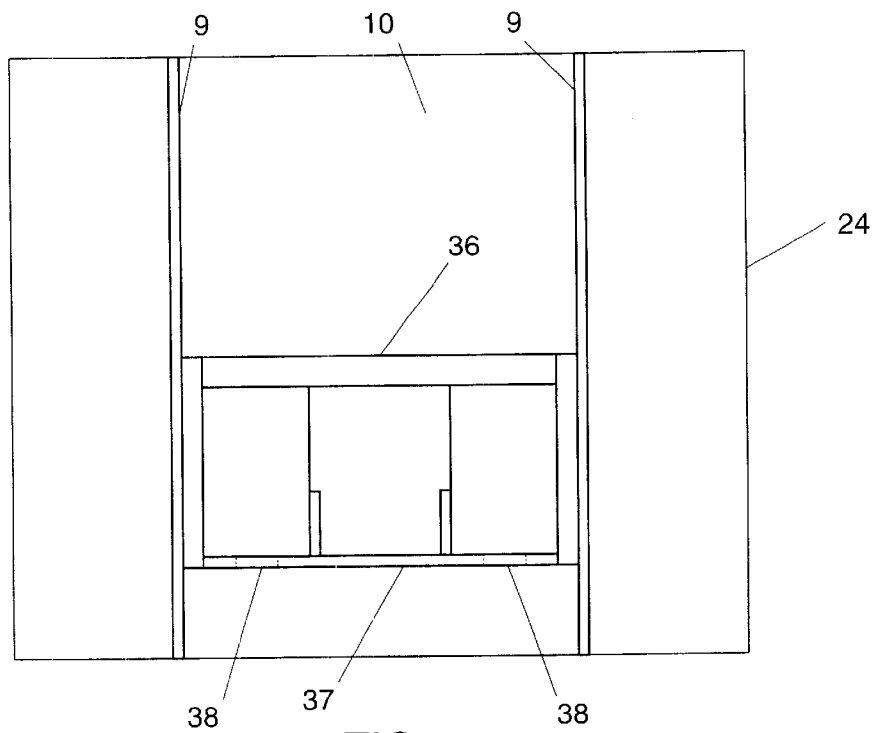
FIG. 5 is an elevation showing the hitch assembly for securing the apparatus to a skid loader.

FIG. 5 shows apparatus for attaching the spreader of this invention to the front end of a skid loader. A different attachment means can be used to attach the spreader to a tractor 3-point hitch, or to another type of vehicle. Skid loader attachment means consists of a top attachment bar 36, which has a sloping, projecting surface for securing the tops of the two feet of the skid loader. Bottom bracket 37 has holes 38 for receiving the bottoms of the skid loader attachment feet. The spreader device is attached to the skid loader by first inserting the skid loader attachment feet under top bar 36 and then inserting and locking the lower surfaces of the skid loader attachment feet into holes 38 in bottom bracket 37. This attachment means allows the hopper to be raised and tipped forward when scooping a load of material to be spread.

To use the disclosed apparatus for spreading particulate material such as sawdust, the following steps would be followed. Typically, a pile of sawdust is rammed by the hopper while tipped forward to force the sawdust into the hopper. The hopper is righted and moved to the site for spreading. There, the operator applies hydraulic pressure to both the agitator shaft motor and to the conveyor motor to thereby begin spreading.

The distance which the material is spread is controlled primarily by the speed of the conveyor, and the quantity of material is primarily controlled by the opening of gate 11. The particulate material may be discharged from the opposite side of the hopper by reversing the direction of rotation of motor 16, which causes the conveyor to move particulate material through the opposite gate.

When the spreader is used for spreading silage for feeding livestock, the hopper is typically filled by placing the hopper under a mixer used to blend several ingredients, such as silage nutrients, and additives. Such a blend is usually moist and does not flow as readily as dry material such as sawdust. Spreading such moist material as corn silage and haylage has presented problems in the prior art due to the tendency for the material to agglomerate or clump and Hereby fail to deliver a consistent quantity of material for spreading, Thus, this problem is solved in this invention by using an agitator shaft 6 with a plurality of beater arms 8 to move the material downward and onto the conveyor floor 21.

While a single agitator shaft is adequate for spreading most materials, it has been found to be advantageous to use a plurality of agitator shafts, spaced either side-by-side or one over the other when spreading some materials which resist moving onto the conveyor.

The apparatus of this invention has been used to spread many types of materials, both dry and moist, including sawdust, silage, mulch, wood shavings, manure, oil absorbers, and others. Thus, the specific design may be adapted by one skilled in the art so as to provide apparatus capable of spreading many other types of materials within the spirit of this disclosure.

What I claim is:

1. Apparatus for spreading particular material comprising, a hopper having upright sides forming at least one opening for filling with said material and at least one side having an opening for discharging said material from the side of the hopper, sloping surfaces within said hopper facilitating movement of said material onto a conveyor, a transverse conveyor for accelerating and forcefully discharging the material in a substantially horizontal direction through said side opening, a transverse shaft mounting a plurality of beater arms which are in contact with said material, wherein said shaft rotates and the beater arms rotate within said material and thereby urge said material to move onto said conveyor, a moveable gate placed over said conveyor at a position proximate said side opening thereby restricting the open area of said side opening and thereby controlling the quantity of material discharged through said side opening, drive means to power said conveyor and to power said transverse shaft carrying said beater arms; and attachment means for affixing said apparatus to a prime mover.

2. The apparatus as in claim 1 in which a removable deflector is placed adjacent to said side opening so as to deflect said discharged material downwardly.

3. Apparatus as in claim 1 in which said conveyor comprises longitudinal slats which drag said material along a fixed surface and which discharges said material through said opening.

4. Apparatus as in claim 1 in which said conveyor comprises a belt.

5. Apparatus as in claim 3 in which said slats are coupled to chains.

6. Apparatus as in claim 3 in which said fixed surface comprises a plastic material.

\* \* \* \* \*